(12) United States Patent
Hariman (10) Patent No.: US 7,518,436 B1
(45) Date of Patent: Apr. 14, 2009

(54) CURRENT DIFFERENCING CIRCUIT WITH FEEDFORWARD CLAMP

(75) Inventor: George A. Hariman, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 51 days.

(21) Appl. No.: 11/557,804

(22) Filed: Nov. 8, 2006

(51) Int. Cl.
*G05F 1/10* (2006.01)
(52) U.S. Cl. .................. 327/540; 327/541; 327/543
(58) Field of Classification Search .............. 327/540, 327/541, 543
See application file for complete search history.

(56) References Cited

U.S. PATENT DOCUMENTS

| | | | |
|---|---|---|---|
| 4,270,081 A * | 5/1981 | Hareyama | 323/316 |
| 5,182,468 A | 1/1993 | Erdelyi et al. | |
| 5,465,067 A | 11/1995 | Anderson | |
| 5,512,816 A * | 4/1996 | Lambert | 323/315 |
| 5,783,936 A * | 7/1998 | Girard et al. | 323/315 |
| 5,801,517 A | 9/1998 | Borle et al. | |
| 6,215,290 B1 | 4/2001 | Yang et al. | |
| 6,404,175 B1 | 6/2002 | Yang et al. | |
| 6,433,610 B1 | 8/2002 | Sawai et al. | |
| 6,600,303 B2 * | 7/2003 | Ikehashi | 323/315 |
| 6,600,304 B2 * | 7/2003 | Kim | 323/315 |
| 6,853,169 B2 | 2/2005 | Burstein et al. | |
| 6,940,261 B1 | 9/2005 | Umminger | |
| 6,952,093 B1 | 10/2005 | Broach et al. | |
| 6,969,976 B1 | 11/2005 | Broach et al. | |
| 6,985,028 B2 * | 1/2006 | Lee et al. | 327/543 |
| 7,098,728 B1 | 8/2006 | Mei et al. | |

OTHER PUBLICATIONS

Webster's II, New Riverside University Dictionary, Houghton Miffin Co., p. 944, 1984.*
Feng et al. "An Adaptive Current Mode Fuzzy Logic Controller for DC-to-DC Converters." IEEE Applied Power Electronics Conference 2003, vol. 2, pp. 983-989.
Sasaki et al., "Fuzzy Multiple-Input Maximum and Minimum Circuits in Current Mode and Their Analyses Using Bounded-Difference Equations," IEEE Transactions on Computers, vol. 39, No. 6, Jun. 1990, pp. 768-774.
Pojanasuwanchai et al., "Fuzzy Multiple-Input Maximum Circuit in Current-mode," SICE Annual Conference in Fukui, Aug. 2003, pp. 2990-2994.
Mesgarzadeh, Behzad, "A CMOS Implementation of Current-Mode Min-Max Circuits and A Sample Fuzzy Application," IEEE, Jul. 2004, pp. 941-946.
Gu et al, "A Multiphase DC/DC Converter with Hysteretic Voltage Control and Current Sharing," IEEE, APEC 2002, pp. 670-674.

* cited by examiner

*Primary Examiner*—Kenneth B. Wells
(74) *Attorney, Agent, or Firm*—Darby & Darby P.C.; Matthew M. Gaffney (57) ABSTRACT

A current difference circuit is provided. The currents difference circuit provides an output current that is the difference of two input currents, while employing feedforward to clamp the output current. The current difference circuit brings the lower of the two input currents along with the higher of the two such that the difference between them is always constant if the difference is beyond the clamp range.

19 Claims, 13 Drawing Sheets

CURRENT DIFFERENCING CIRCUIT WITH FEEDFORWARD CLAMP

FIELD OF THE INVENTION

The invention is related to electronic circuits, and in particular but not exclusively, to a current difference circuit with feedforward current clamping on the current difference.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a current difference circuit. The current difference circuit provides an output current that is the difference of two input currents, while employing feedforward to clamp the output current. The current difference circuit brings the lower of the two input currents along with the higher of the two such that the difference between them remains constant if the difference is beyond the clamp range.

Figure 1:
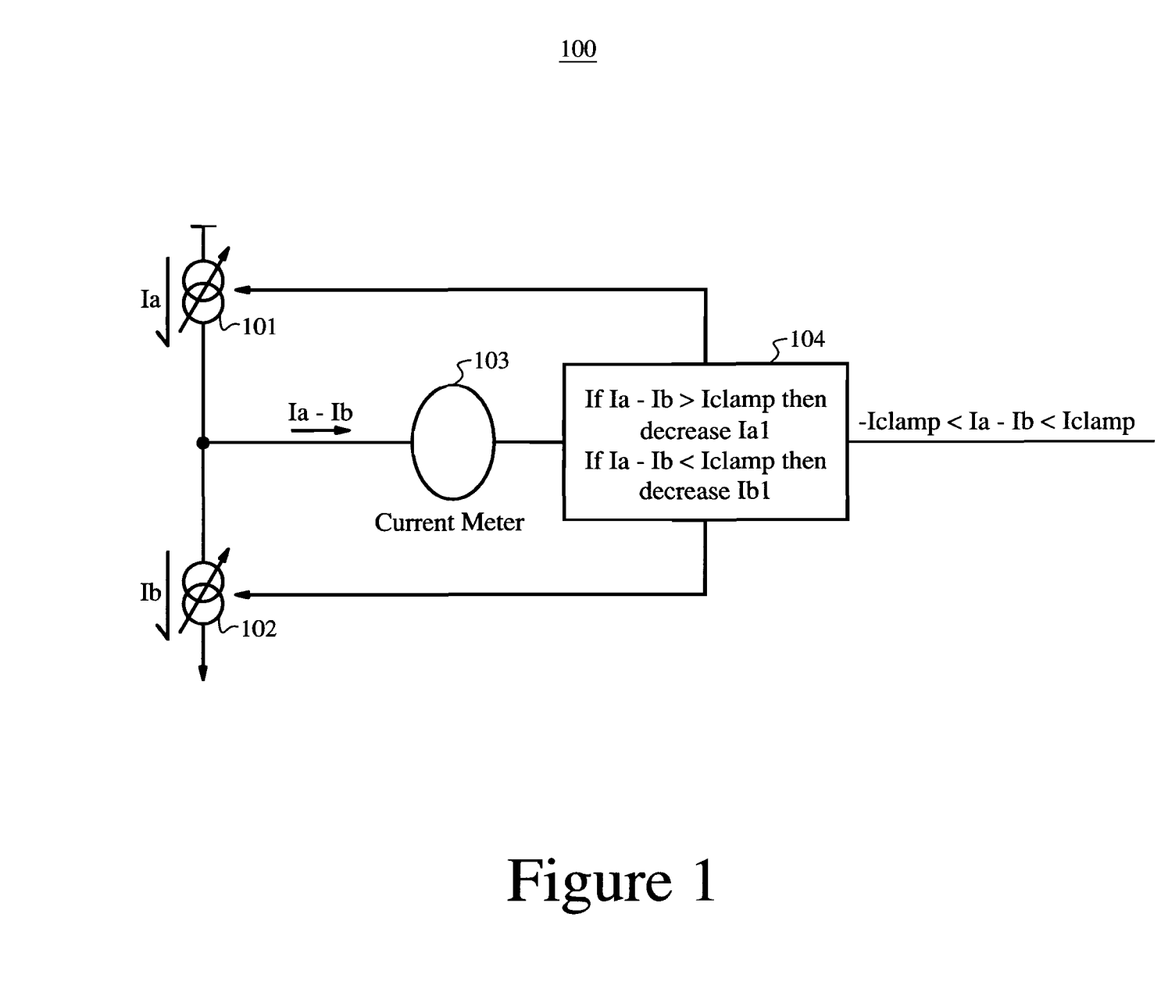
FIG. 1 shows a block diagram of an example of a current difference circuit with feedback clamping.

FIG. 1 shows a block diagram of an example of circuit 100. Circuit 100 includes adjustable current source 101, adjustable current source 102, current meter 103, and comparison and decision block 104.

Adjustable current source 101, adjustable current source 102, and current meter 103 are arranged so that current meter 103 receives the output current Ia−Ib, which is measured by current meter 103. Block 104 compares Ia−Ib with Iclamp, and compares Ia−Ib with −Iclamp. Further, block 104 makes a decision on how much the quantity (if at all) is over (or under) the clamp value, then feeds back this information to the circuit, adjusting adjustable current source 101 or adjustable current source 102 so neither Iclamp nor −Iclamp is exceeded. Circuit 100 is a feedback circuit which may oscillate if the phase margin of the closed loop system is less than 0 degrees. In addition, the feedback requires settling time.

Figure 2:
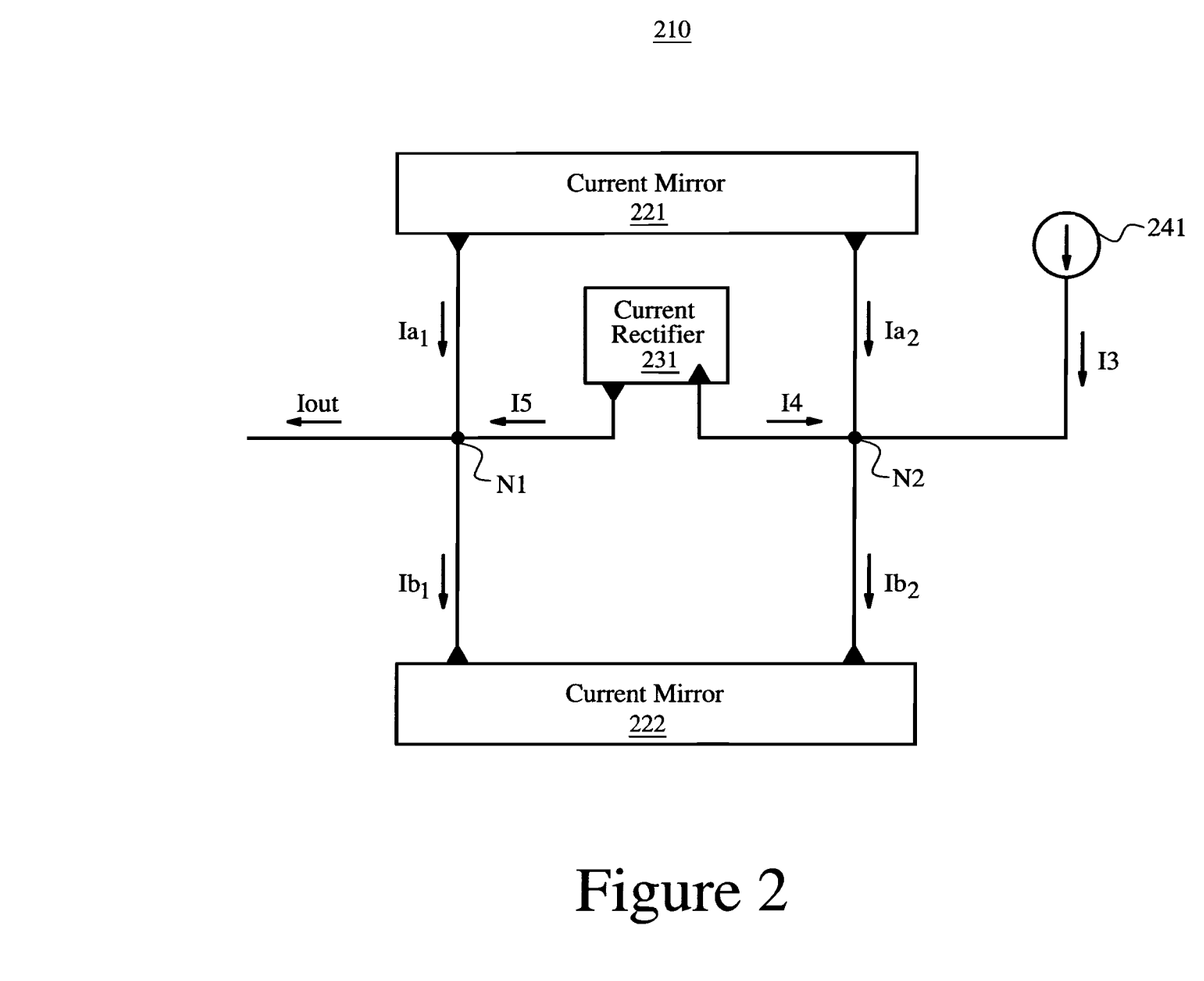
FIG. 2 illustrates a block diagram of an embodiment of a current difference circuit with feedforward clamping.

FIG. 2 illustrates a block diagram of an embodiment of circuit 210. In operation, circuit 210 provides current Iout so that Iout=Ia1−Ib1, with Iout clamped on at least one side, where the clamping is accomplished via feedforward. In the embodiment shown in FIG. 2, Iout is clamped on the bottom side. However, in other embodiments of circuit 210, Iout may be clamped on the top side, or clamped on both sides. One embodiment of circuit 210 includes current mirror 221, current mirror 222, current rectifier 231, and current source 241.

Current mirror 221 may be arranged to source current $Ia_1$ to node N1, and to source current $Ia_2$ to node N2. Conversely, current mirror 222 may be arranged to sink current $Ib_1$ from node N1 and to and sink current $Ib_2$ from node N2. In one embodiment, current mirrors 221 and 222 are 1:1 current mirrors. In other embodiments, a ratio other than 1:1 may be employed.

In one embodiment, current source 241 is arranged to provide current I3 to node N2. In the embodiment illustrated in FIG. 2, current source 241 sources current. In this embodiment, −I3 is the low clamp level which current Iout is clamped from being less than. In another embodiment, current source 241 sinks current to provide a high clamp level which Iout is clamped from exceeding. In one embodiment, current rectifier 231 is arranged receive current I4 from node N2, and to provide current I5 to node N1 by rectifying current I4.

Instead of provided a clamped current difference with a gain of 1, so that Iout=Ia−Ib (clamped), some embodiments may provide gain, so that Iout=[G*(Ia−Ib)] (clamped), where G represents a gain value. Through the specification and claims, this is still considered to constitute a current difference even though a gain is applied. In this case, or course, the clamped "difference" is simply between G*Ia and G*Ib, rather than between Ia and Ib.

Figure 3:
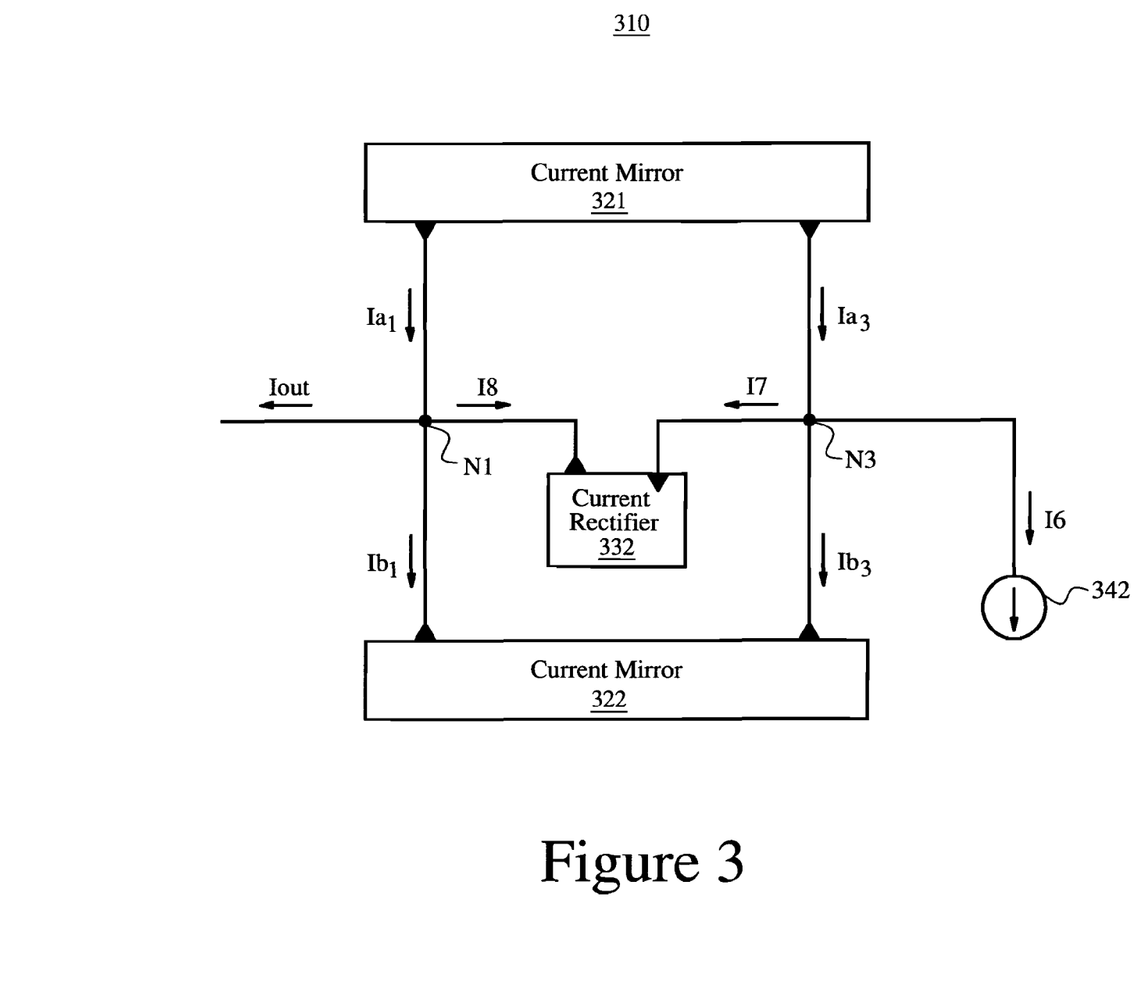
FIG. 3 shows a block diagram of an embodiment of the circuit of FIG. 2.

FIG. 3 shows a block diagram of an embodiment of the circuit 310, which may be employed as an embodiment of circuit 210 of FIG. 2. Circuit 310 is similar to the circuit illustrated in FIG. 2, albeit different in some ways. The embodiment illustrated in FIG. 3 is arranged to clamp Iout on the top side.

Current mirror 321 is arranged to source current $Ia_1$ to node N1, and to source current $Ia_3$ to node N3. Conversely, current mirror 322 is arranged to sink current $Ib_1$ from node N1 and to and sink current $Ib_3$ from node N2. Current source 342 is arranged to sink current I6 from node N3. Further, current rectifier 332 is arranged receive current I7 from node N3, and to sink current I8 from node N1 by rectifying current I7.

One embodiment of circuit 210 of FIG. 2 includes node N2, current source 241, and current rectifier 231, which operate together to source current I5 to node N1, and further includes node N3, current source 342, and current rectifier 332 of FIG. 3, which operate together to sink current I8 from node N1. In this embodiment, feedforward clamping of Iout from both sides is accomplished. In various embodiments, the two-way clamping may be symmetrical, so that I6=Iclamp and I3=−Iclamp, or asymmetrical, so that I6=Iclamp1, and I3=−Iclamp2, with Iclamp1 not equal to Iclamp2.

Figure 4:
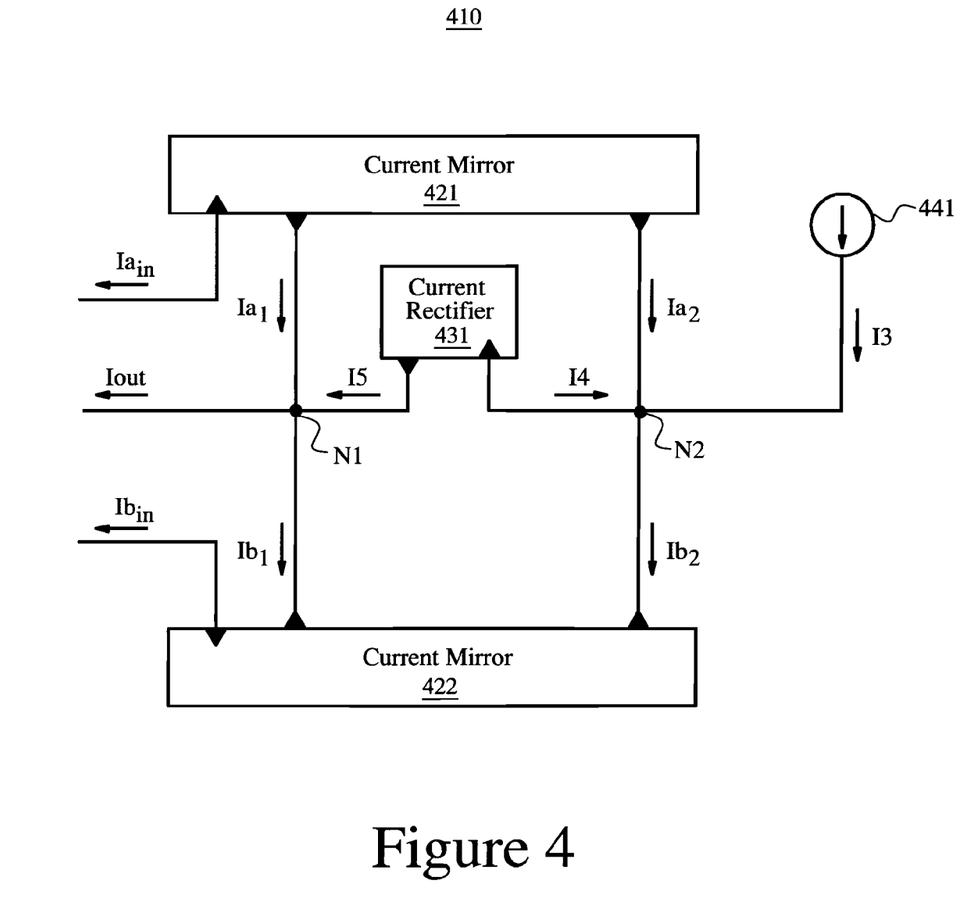
FIG. 4 illustrates a block diagram of another embodiment of the circuit of FIG. 2.

FIG. 4 illustrates a block diagram of an embodiment of circuit 410, which may be employed as an embodiment of circuit 210 of FIG. 2. Current mirror 421 is further arranged to receive current $Ia_{in}$, and current mirror 422 is further arranged to receive current $Ib_{in}$.

FIG. 4 shows one embodiment of a manner in which two input currents may be provided for current differencing with feedforward clamping. However, in other embodiments, a separate input branch as illustrated in FIG. 4 is not needed. Instead, in these embodiments, Ia1 and Ib1 may themselves be the input current, each provided by a transistor that is the output stage of a particular circuit, and the current mirror formed by placing transistor(s) in a current mirror arrangement with this transistor.

Figure 5:
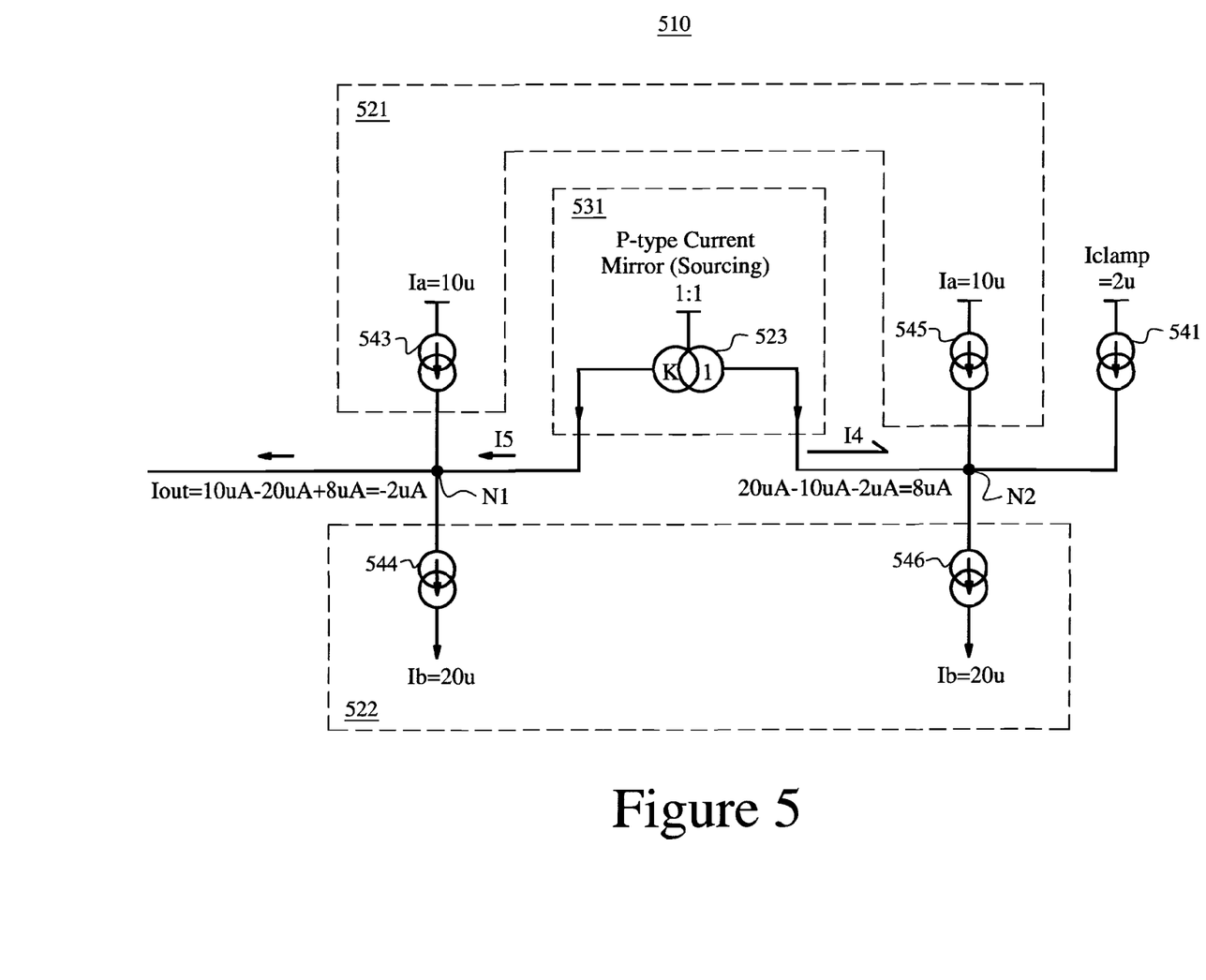
FIG. 5 shows a block diagram of another embodiment of the circuit of FIG. 2.

FIG. 5 shows a block diagram of an embodiment of circuit 510, which may be employed as an embodiment of circuit 210 of FIG. 2. Current mirror 521 may include current source 543 and current source 545. Similarly, current mirror 522 may include current source 544 and current source 546. In one embodiment, current rectifier 531 includes current mirror 523. In this embodiment, current mirror 523 operates as a current rectifier because current mirror 523 mirrors current I4 only if current I4 (going from current mirror 523 to node N2) is positive.

Although particular values for 1a, 1b, and Iclamp are used for FIG. 5, these values are used by way of example only, and the invention is not so limited.

In the embodiment shown in FIG. 5, circuit 510 is arranged to operate so that:
 if Ia−Ib <−Iclamp, then Iout=Ia−Ib−(Ia−Ib+Iclamp) Iclamp else Iout=Ia−Ib FIG. 5 illustrates a case in which Ia−Ib <−Iclamp (e.g., Ib=20 uA, Ia=10 uA, Ia−Ib is clamped to −2 uA). Based on Kirchhoff's Current Law (KCL), current I4=20 µA−10 µA-2 µA=8 µA. Because I4 is greater than zero, it is mirrored by current mirror 523 and I5=8 µA. Based on KCL, Iout=10 µA−20 µA+8 µA=−2 µA. Current Iout is clamped to −2 µA.

Figure 6:
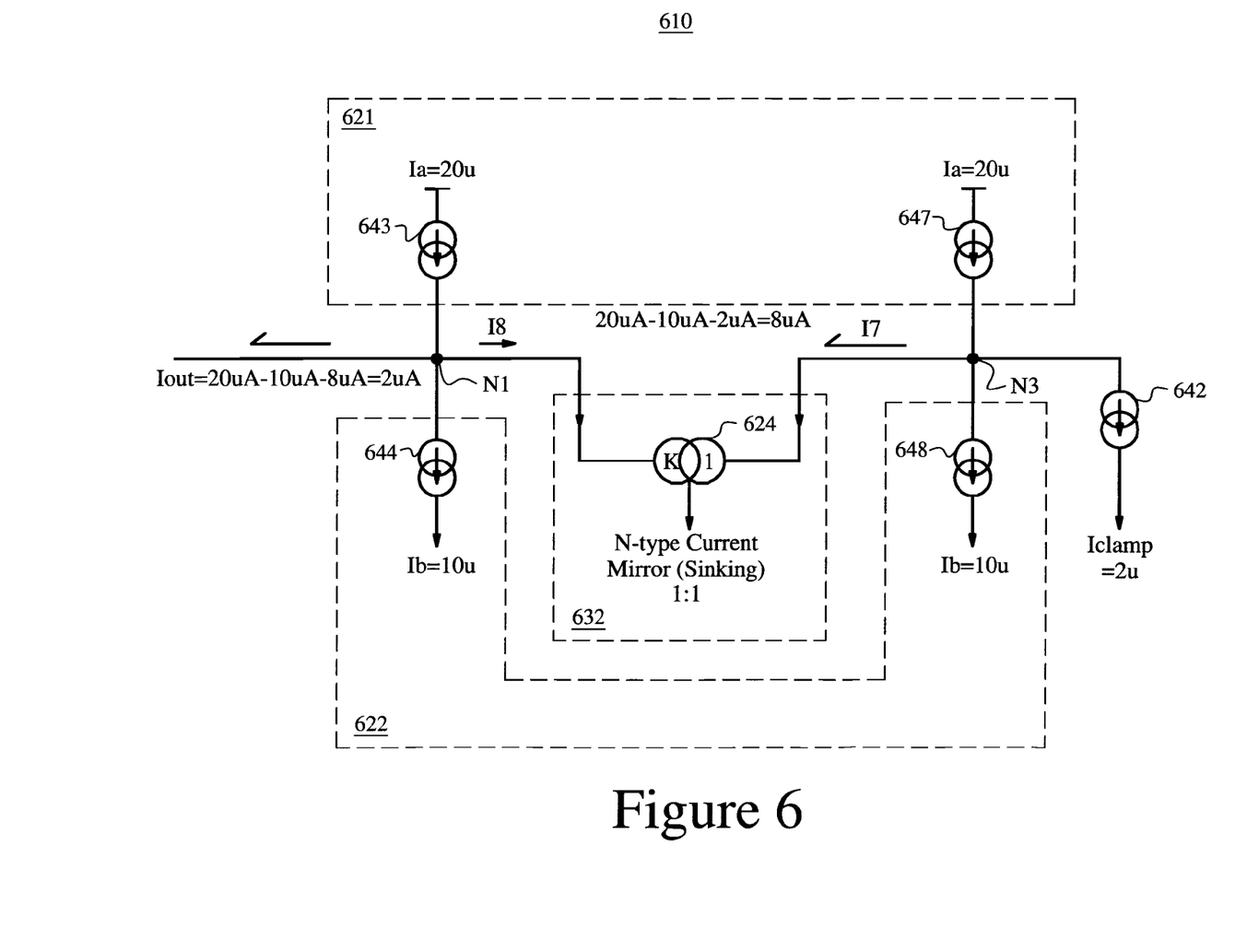
FIG. 6 illustrates a block diagram of an embodiment of the circuit of FIG. 3.

FIG. 6 shows a block diagram of an embodiment of circuit 610, which may be employed as an embodiment of circuit 310 of FIG. 3. Current mirror 621 includes current source 643 and current source 647. Similarly, current mirror 622 includes current source 644 and current source 647. Current rectifier 632 includes current mirror 624. Current mirror 624 operates as a current rectifier because current mirror 624 mirrors current I7 only if current I7 (going from node N3 to current mirror 624 is positive).

Although particular values for 1a, 1b, and Iclamp are used for FIG. 6, these values are used by way of example only, and the invention is not so limited.

Circuit 610 is arranged to operate so that:
 if Ia−Ib >+Iclamp, then Iout=Ia−Ib−(Ia−Ib−Iclamp)=+ Iclamp else Iout=Ia−Ib FIG. 6 illustrates a case in which Ia−Ib >+Iclamp (e.g., Ia=20 uA, Ib=10 uA, Ia−Ib is clamped to +2 uA). As previously discussed, in another embodiment of circuit 510, clamping may be performed on both sides, as illustrated in FIGS. 7A and 7B in one embodiment.

Figure 7A:
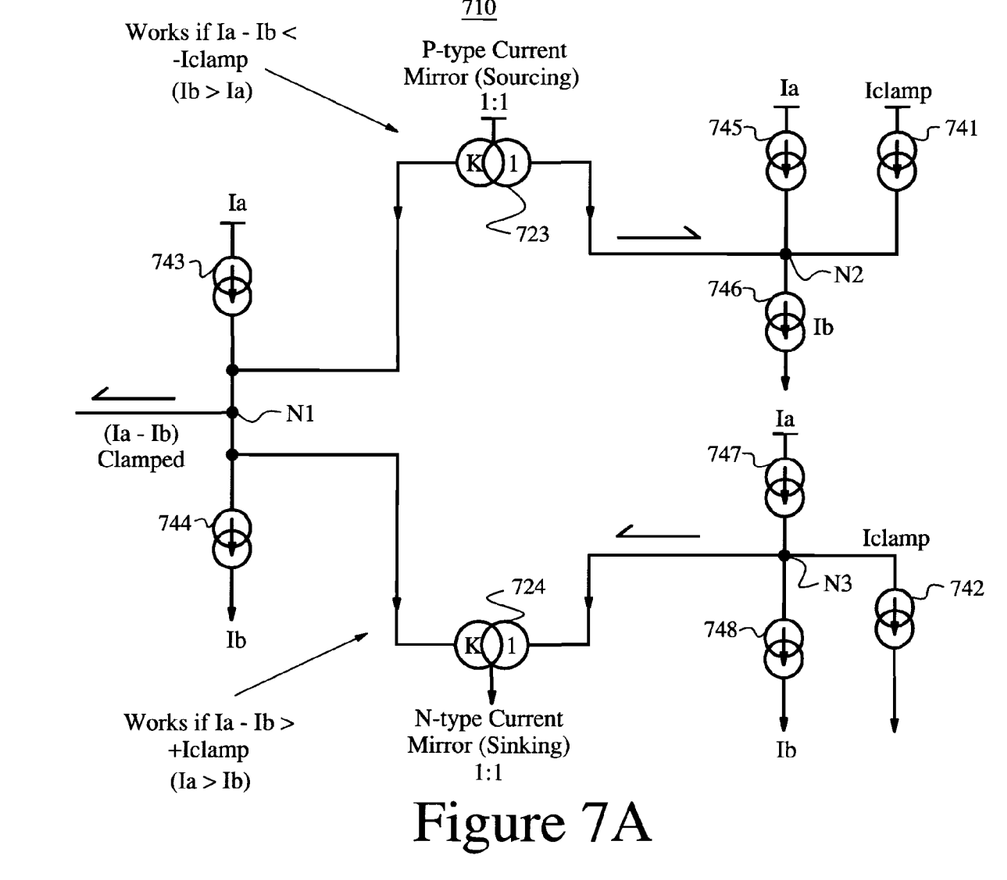
FIGS. 7A-B show block diagrams of an embodiment of the circuit of FIG. 5.
Figure 7B:
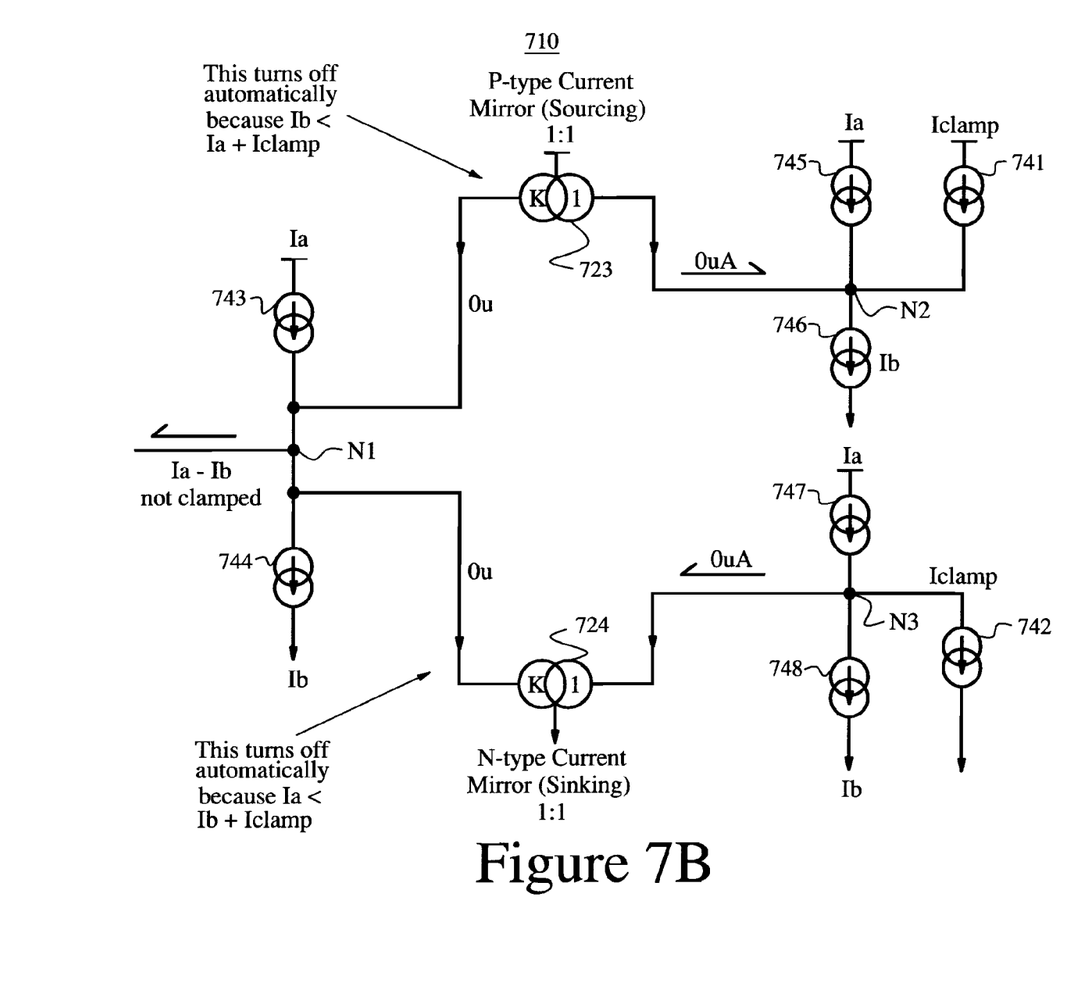

FIGS. 7A-B show block diagrams of an embodiment of circuit 710, which is an embodiment of circuit 510 of FIG. 5 with clamping on both sides.

For an embodiment with symmetrical clamping on both sides, circuit 510 is arranged to operate so that:
 if Ia−Ib>+Iclamp, then Iout=Ia−Ib−(Ia−Ib−Iclamp)=+ Iclamp if Ia−Ib <−Iclamp, then Iout=Ia−Ib−(Ia−Ib+ Iclamp)=−Iclamp else if −Iclamp<Ia−Ib <+Iclamp then Iout=Ia−Ib FIG. 7A illustrates circuit 710 operating with Ia−Ib exceeding either clamp. If Ia−Ib<−Iclamp, current mirror 723 mirrors a sourcing current to clamp Ia−Ib. In this case, current mirror 724 does not output any current. Conversely, if Ia−Ib >+Iclamp, current mirror 724 sinks current to clamp Ia−Ib. In this case, current mirror 723 does not output any current.

FIG. 7B illustrates circuit 710 in the operating region when Ia−Ib is within the +/− Iclamp region. When in this region, the clamping automatically turns off because both P-type (sourcing) current mirror 723 and N-type (sinking) current mirror 724 are turned off.

Although FIGS. 7A-7B show symmetrical two-way clamping, as discussed above, in other embodiments asymmetrical two-way clamping may be employed (e.g. by having current source 741 and current source 742 with different current from each other). These embodiments and others are within the scope and spirit of the invention.

Figure 8A:
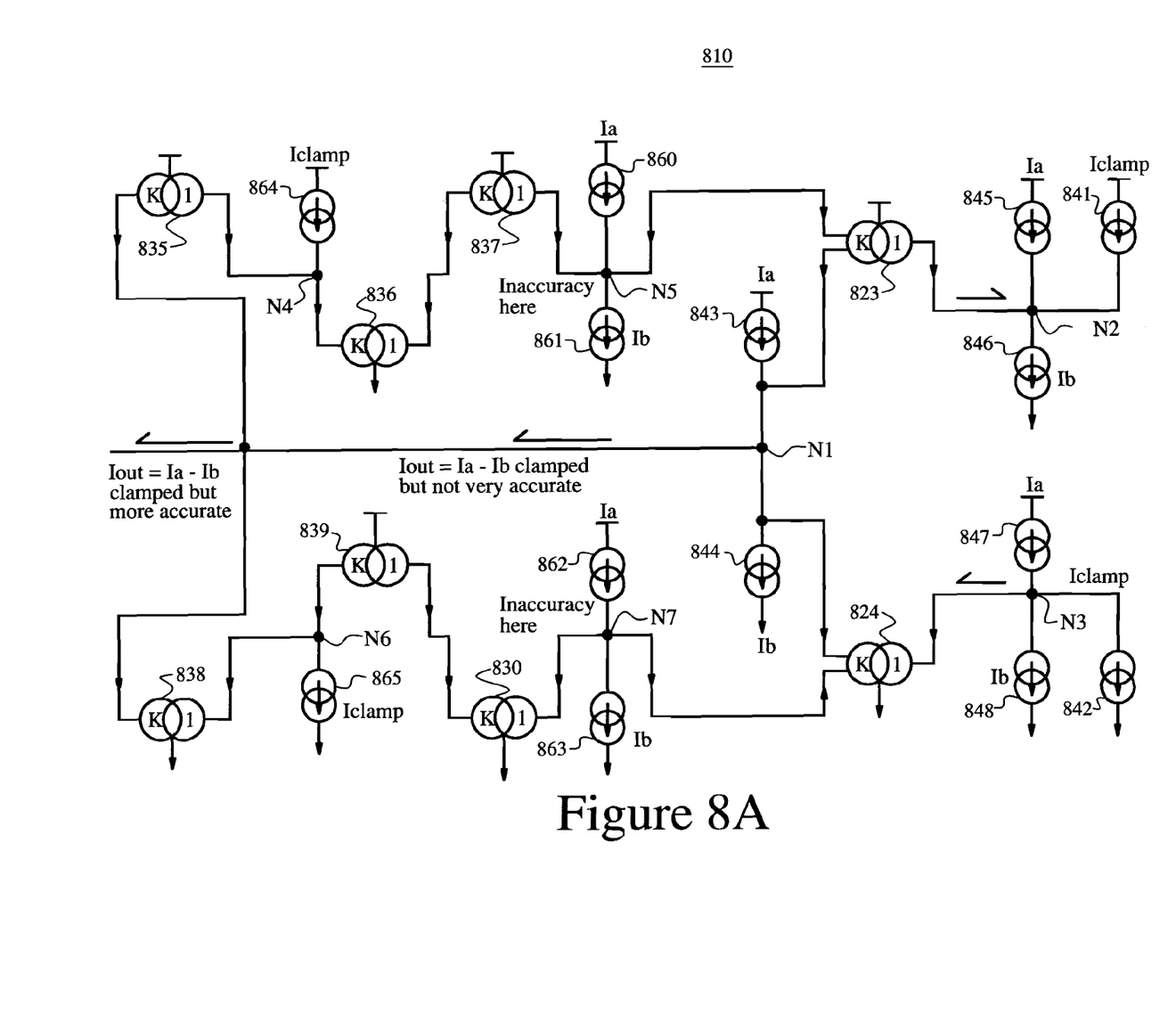
FIGS. 8A-C illustrate block diagrams of an embodiment of the circuit of FIG. 7A.
Figure 8B:
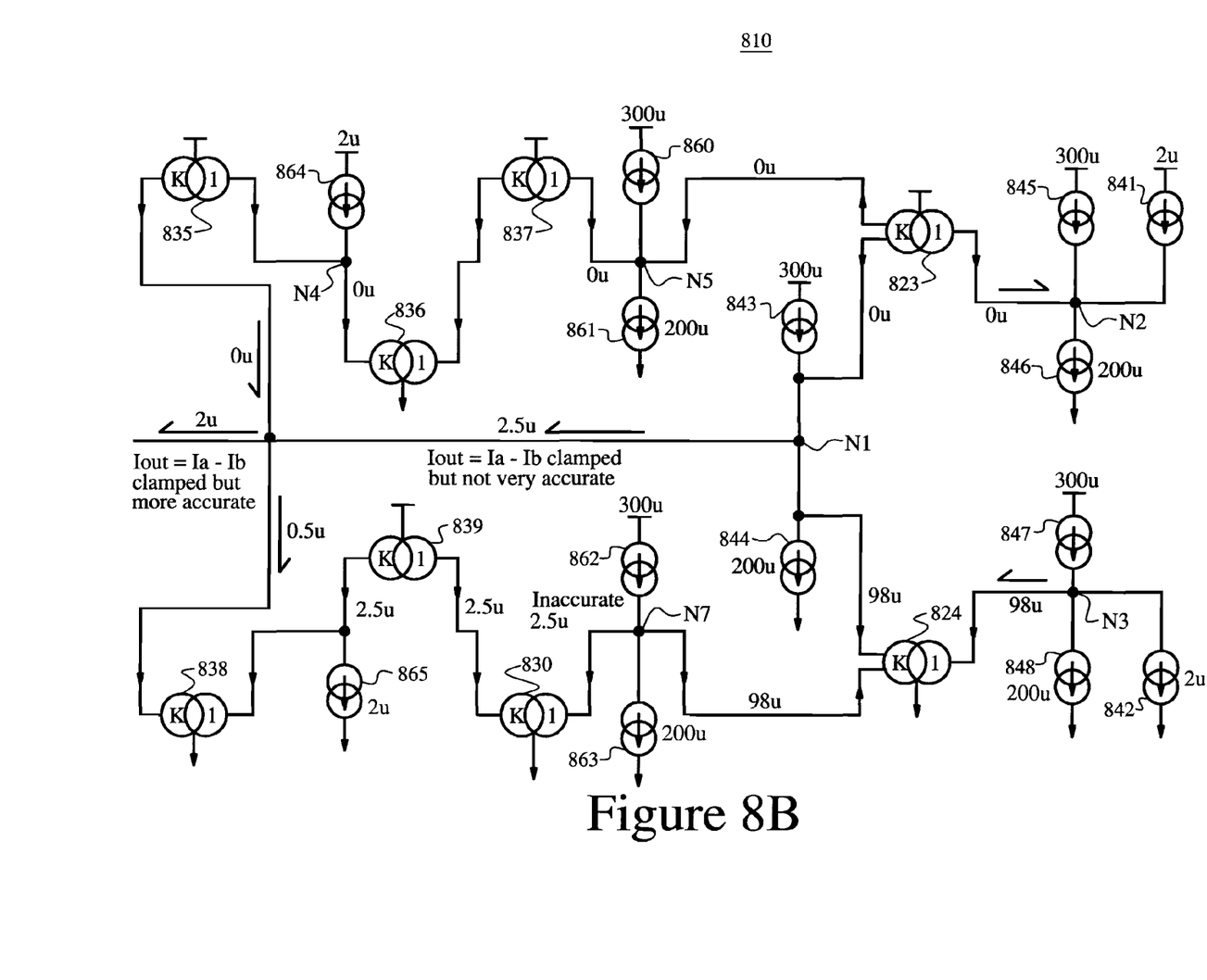
Figure 8C:
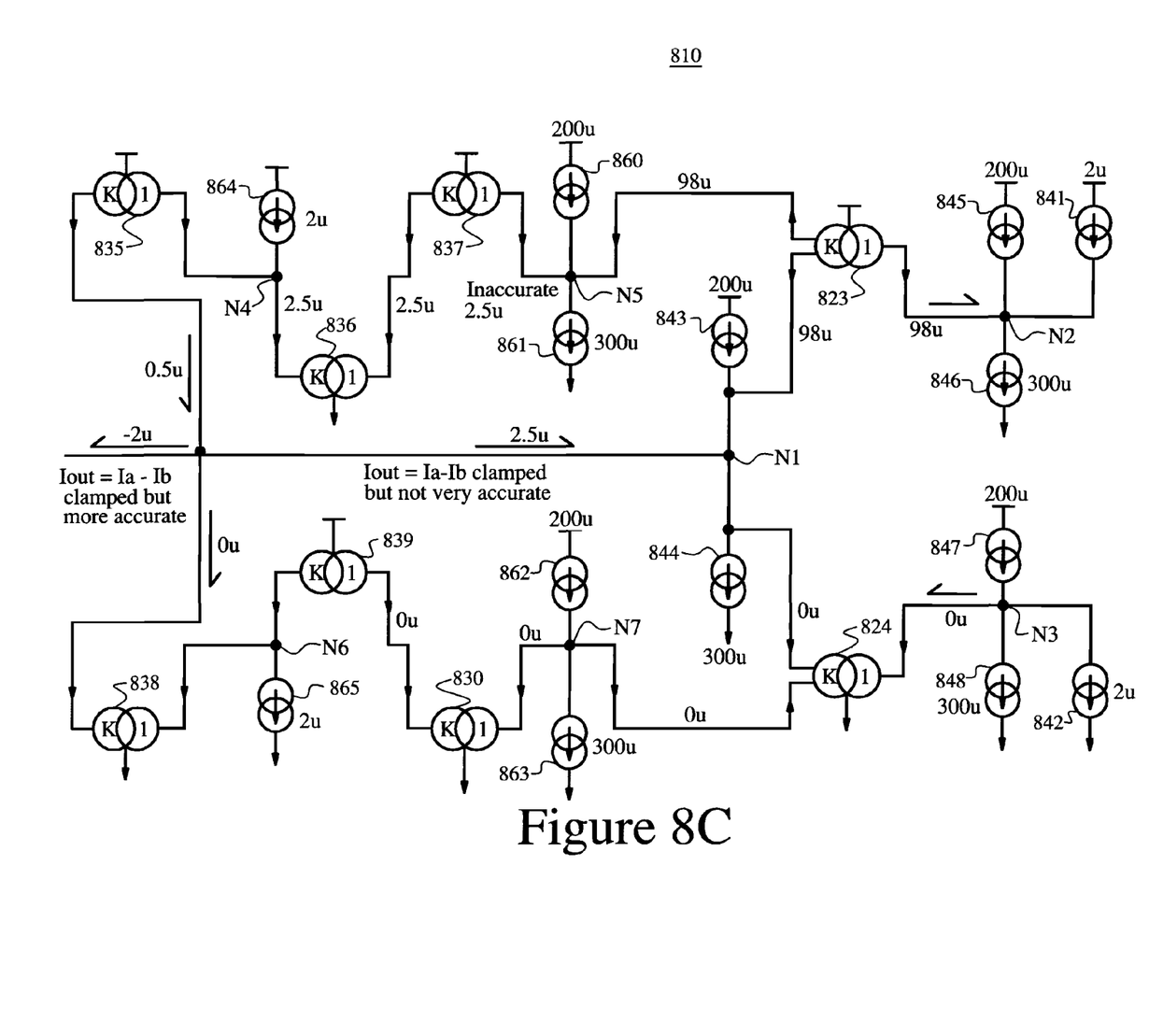

FIGS. 8A-C illustrate block diagrams of an embodiment of circuit 810, which may be employed as an embodiment of circuit 710 of FIG. 7A. Circuit 810 further includes current sources 860-865, and current mirrors 830 and 835-839.

Circuit 710 of FIG. 7A may be relatively accurate when the currents involved in the subtraction (Ia and Ib used in the discussion above) are small. However, when the currents involved are relatively large, then the difference may be relatively inaccurate since taking the difference of two big numbers, especially if they are similar to each other, typically results in more errors. As one example, the difference of 20 uA-18 uA, as illustrated above in FIG. 7A, is typically much more accurate in giving 2 uA compared to 300 uA-298 uA, because the latter may yield more rounding errors.

FIG. 8A illustrates circuit 810, which includes additional circuitry that directly senses the output current difference (Ia−Ib). This additional circuitry subtracts (positive or negative direction) the difference of the output difference current (Ia−Ib) and the clamp current to the clamped output difference current. The additional circuitry senses the clamped current (that may be inaccurate) and subtracts any inaccuracy on the clamped Ia-Ib. More specifically, the clamp current Iclamp is subtracted from a replica of the (possibly inaccurate) clamped current (at node N4 if Iout is negative or at node N6 if Iout is positive), the difference is rectified (by current mirror 835 if Iout is negative or by current mirror 838 if Iout is positive), and the rectified difference is provided to node N1 to subtract the inaccuracy, if any.

In one embodiment, current mirrors 836, 837, 830, and 839 are omitted from circuit 810. In this embodiment, as well as the embodiment illustrated, node N4 is coupled to node N5, and node N6 is coupled to node N7. For example, node N5 may be coupled directly to node N4, or in another embodiment be coupled to node N4 through one or more active or passive intermediary devices, such as current mirrors as shown in FIG. 8A.

FIG. 8B illustrates circuit 810 operating with Ia=300 uA and Ib=200 μA with Iclamp=2 uA. As discussed above, the output voltage at node N1 may not be inaccurate. Suppose for the sake of discussion that some inaccuracy in subtracting the two relatively large numbers the difference turns out to be clamped at 2.5 μA (which is higher than the desired clamp current of 2 μA). Accordingly, the additional circuitry first subtracts 2 μA (the clamp level) from 2.5 μA. This process may be more accurate as it involves relatively small numbers. Next, circuit 810 subtracts 0.5 μA from 2.5 μA, which yields the desired accurate clamped current at 2 μA.

FIG. 8C shows circuit 810 operating with Ia=200 μA and Ib=300 μA.

Circuit 810 includes no feedback path or any type of decision circuitry. Circuit 810 operates in an analog fashion in a feedforward path.

In an embodiment of circuit 810, for proper operation, all the devices that operate as either current sources or current mirrors should preferably be biased in the active (linear) operating region in order to ensure accuracy of operation. In this embodiment, node N1 is preferably to be biased correctly to ensure that any current source of current mirrors connected to node N1 are operating correctly. The operating ranges of the current sources and current mirror are preferably taken into account to ensure linear operation.

Figure 9:
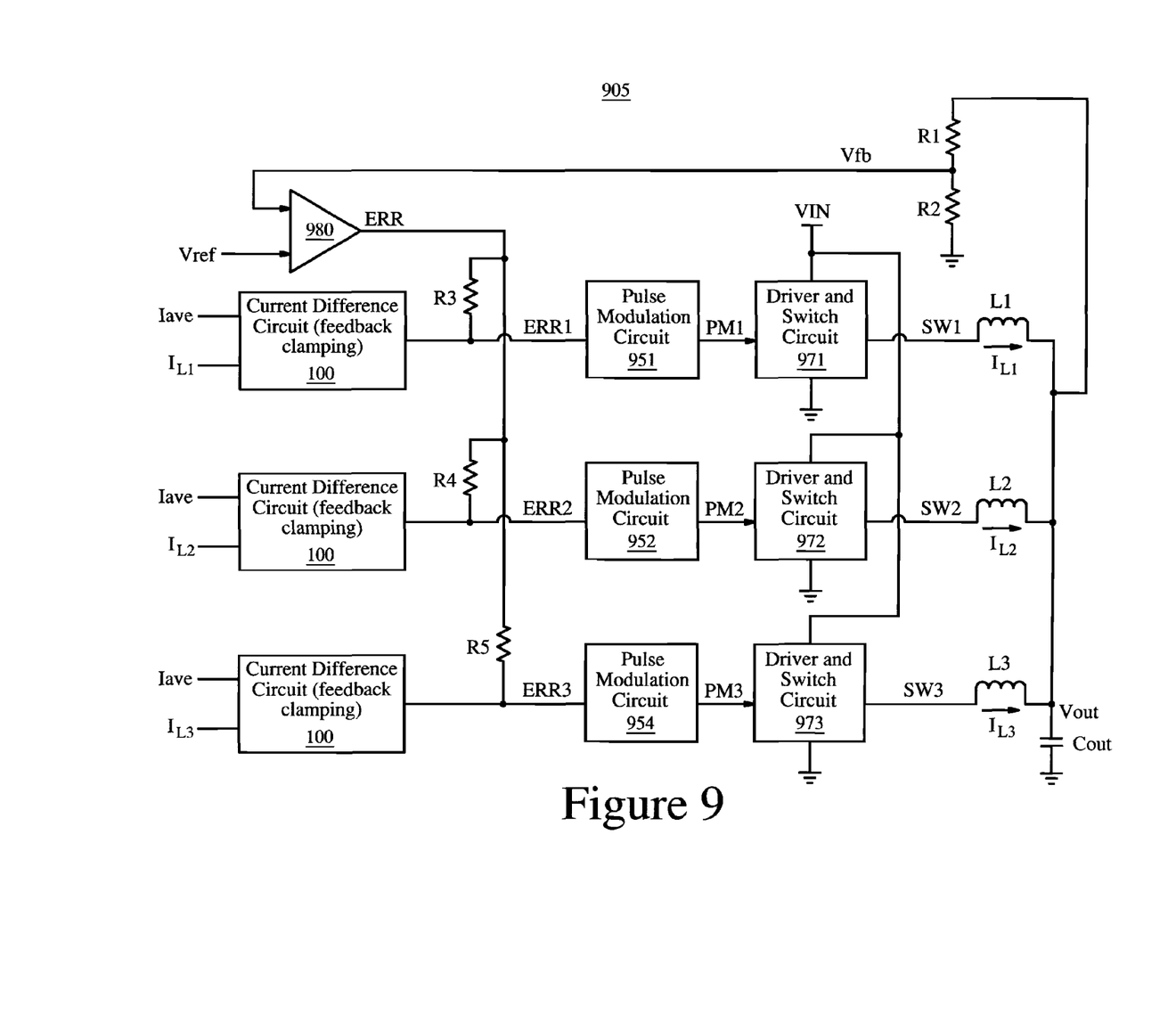
FIG. 9 shows an example of a multi-phase buck regulator that includes the circuit of FIG. 1.

FIG. 9 shows an example of multi-phase buck regulator 905, which includes circuit 100 of FIG. 1. Multi-phase buck regulator 905 includes inductors L1-L3, resistors R1-R5, output capacitor Cout, error amp 980, three current difference circuits 100, pulse modulation circuits 951-953, and driver and switch circuits 971-973. Current difference circuit 100 is illustrated in FIG. 1 above.

Inductors L1-L3 each provide a corresponding inductor current $I_{L1}$-$I_{L3}$ in the corresponding phase 1-3, with the inductor currents combined and provided to output capacitor Cout. Output capacitor Cout provides output voltage Vout. Further, resistors R1 and R2 operate as a voltage divider to provide feedback voltage Vfb. Error amp 980 provides signal ERR based on feedback voltage Vfb and reference voltage Vref. Also, the first current difference circuit 100 provides a current given by G*(Iave−IL1) clamped, where G is a gain value, and Iave is the average inductor current (IL1+IL2+IL3)/3. Similarly, the other current difference circuits each provide a corresponding current output based on the corresponding inductor current.

Pulse modulation circuits 951-953 each provide a corresponding output signal PM1-PM3 by pulse modulating the corresponding input signal ERR1-ERR3. Further, signals ERR1-ERR3 are provided based on resistors R3-R5 respectively by offsetting signal ERR based on the output currents provided by each of the three current difference circuits 100, respectively. Driver and switch circuits 971-973 each provide signal SW1-SW3 respectively to inductors L1-L3, respectively.

Figure 10:
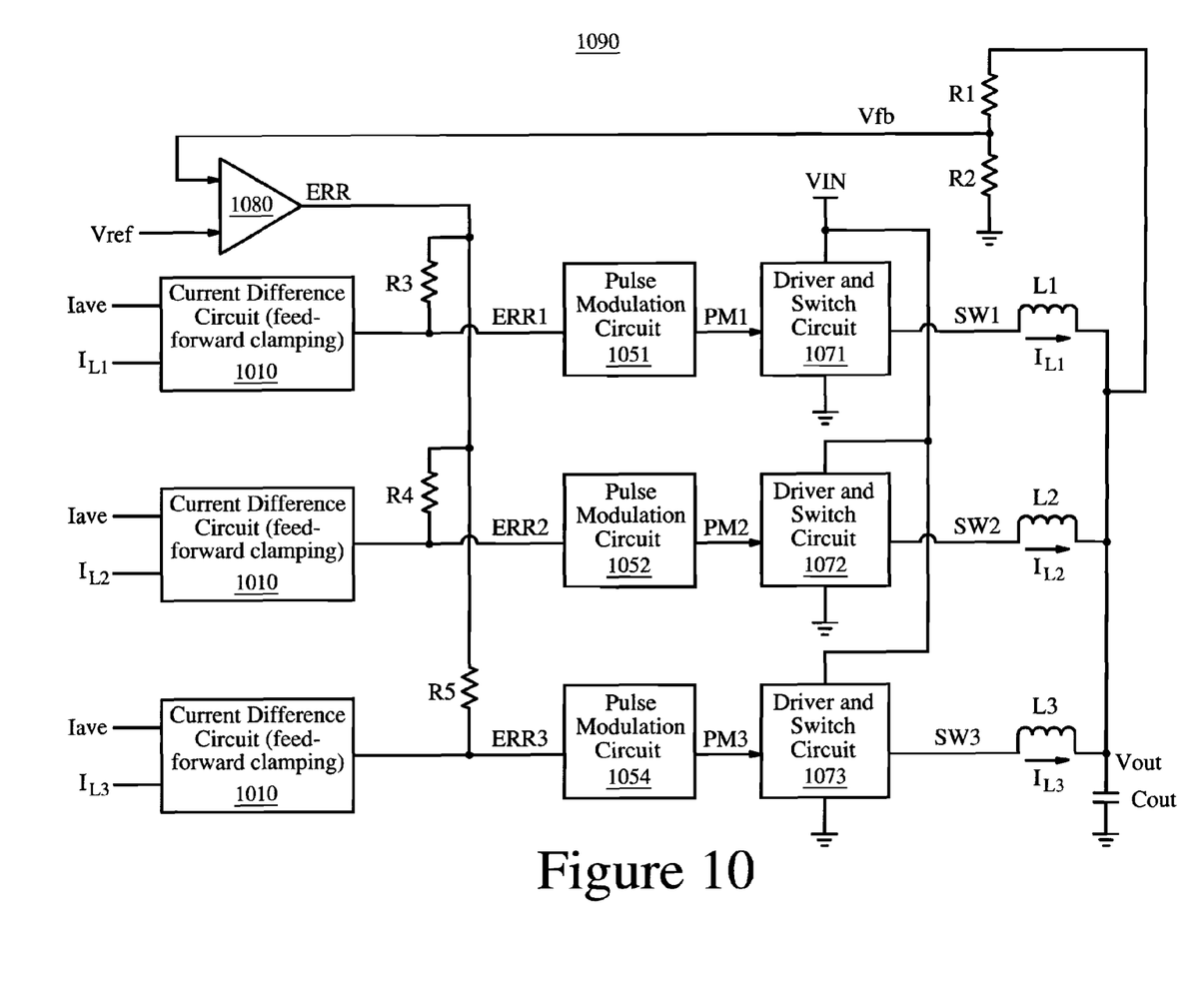
FIG. 10 illustrates an embodiment of a multi-phase buck regulator that includes an embodiment of the circuit of FIG. 2, arranged in accordance with aspects of the present invention.

FIG. 10 illustrates an embodiment of multi-phase buck regulator 1090. Multi-phase buck regulator 1090 is similar to multi-phase buck regulator 905 in some ways, albeit different in other ways. In particular, in place of current difference circuits 100 of FIG. 9, multi-phase buck regulator 1080 includes current difference circuits with feedforward clamping 1010. Each of these circuits is an embodiment of circuit 210 of FIG. 2 with two-way clamping. Because current difference circuits 1010 employ feedforward rather than feedback, the current sharing operation on multi-phase buck regulator 1090 is faster than multi-phase buck regulator 905.

The offsets provided to signals ERR1, ERR2, and ERR3 allow for multi-phase buck regulator 1090 to substantially equalize the phase currents. The current difference is clamped on both sides so that the offset is not large enough to interfere with the voltage feedback loop.

The currents $I_{L1}$-$I_{L3}$ as sensed and received by circuits 1010 may be generated through virtually any current sense method, such as a sense resistor, a sense transistor, DCR sensing, or the like. In one embodiment, current Iave may be generated by providing the combined sensed inductor currents to an RC network. In other embodiments, current Iave may be generated in other ways.

In one embodiment, each of the pulse modulation circuits 1051 is a pulse width modulator that compares the corresponding input signal ERR1-ERR3 with a sawtooth signal. In other embodiments, the pulse modulation is accomplished in other ways. Although three phases are illustrated for multi-phase buck regulator 1090 of FIG. 1, the invention is not so limited, and virtually any number of phases may be employed.

FIG. 10 illustrates one particular application for a current difference circuit with feedforward clamping. However, the invention is not so limited, and may be used in virtually in application in which a current difference with clamping on one or both sides is desired, including but not limited to a variety of different current management applications.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for current clamping, comprising:
 a current difference circuit including a plurality of current mirrors and a first current source, wherein the current difference circuit is arranged to provide an output current such that the output current is proportional to a difference between a first current and a second current, such that the output current is clamped, wherein:
 the current difference circuit is arranged such that providing the output current includes:
 providing the first current to a first node;
 providing the second current to the first node;

mirroring the first current to provide a first mirrored current;

mirroring the second current to provide a second mirrored current;

providing the first mirrored current to a second node;

providing the second mirrored current to the second node;

providing a third current to the second node, wherein the third current corresponds to a current limit of one side of the at least one side of the clamping; and providing, to the first node, a fifth current by rectifying a fourth current at the second node, wherein the output current is provided at the first node.

2. The circuit of claim 1, wherein
the first current source has at least an output that is coupled to the first node, and an input that is coupled to the second node, and wherein the plurality of current mirrors include:
a first current mirror having at least a first output that is coupled to the first node, and a second output that is coupled to the second node;

a second current mirror having at least a first output that is coupled to the first node, and a second output that is coupled to the second node; and a third current mirror having an input that is coupled to the second node, and an output that is coupled to the first node, whereby the third current mirror operates as a current rectifier.

3. The circuit of claim 2, wherein
the first current mirror is arranged to source current, and
wherein the second current mirror is arranged to sink current.

4. A circuit for current clamping, comprising:
a first current mirror having at least a first output that is coupled to a first node, and a second output that is coupled to a second node, wherein the first current mirror is arranged to provide a first output current at the second output of the first current mirror by mirroring a first input current;

a second current mirror having at least a first output that is coupled to the first node, and a second output that is coupled to the second node, wherein the second current mirror is arranged to provide a second output current at the second output of the second current mirror by mirroring a second input current;

a first current source having at least an output that is coupled to the second node, wherein the first current source is arranged to provide a third output current at the output of the first current source, wherein the third output current is distinct from the first input current and the second input current; and a third current mirror having at least an input that is coupled to the second node, and an output that is coupled to the first node.

5. The circuit of claim 4, wherein
the first current mirror is arranged to source current, and
wherein the second current mirror is arranged to sink current.

6. The circuit of claim 4, wherein
the first current source is arranged to sink current, and
wherein the third current mirror is arranged to sink current.

7. The circuit of claim 4, wherein
the first current source is arranged to source current, and
wherein the third current mirror is arranged to source current.

8. A circuit for current clamping, comprising:
a first current mirror having at least a first output that is coupled to a first node, and a second output that is coupled to a second node;

a second current mirror having at least a first output that is coupled to the first node, and a second output that is coupled to the second node;

a first current source having at least an output that is coupled to the second node;

a second current source having at least an output that is coupled to a third node;

a third current mirror having at least an input that is coupled to the second node, and an output that is coupled to the first node; and a fourth current mirror having at least an input that is coupled to the third node and an output that is coupled to the first node, wherein the first current mirror further has at least a third output that is coupled to a fourth node, the second current mirror further has at least a third output that is coupled to the fourth node, and wherein the third node is coupled to the fourth node.

9. A circuit for current clamping, comprising:
a first current mirror having at least a first output that is coupled to a first node, and a second output that is coupled to a second node;

a second current mirror having at least a first output that is coupled to the first node, and a second output that is coupled to the second node;

a first current source having at least an output that is coupled to the second node;

a second current source having at least an output that is coupled to a third node, wherein the first current mirror further has at least a third output that is coupled the third node, and wherein the second current mirror further has at least a third output that is coupled to the third node;

a third current mirror having at least an input that is coupled to the second node, and an output that is coupled to the first node; and a fourth current mirror having at least an input that is coupled to the third node, and an output that is coupled to the first node.

10. The circuit of claim 9, further comprising:
a third current source having at least an output that is coupled to a fourth node; and a fifth current mirror having at least an input that is coupled to the fourth node and an output that is coupled to the first node, wherein the first current mirror further has at least a fourth output that is coupled to a fifth node, the second current mirror further has at least a fourth output that is coupled to the fifth node, and wherein the fourth node is coupled to the fifth node.

11. The circuit of claim 10, wherein the fourth node is coupled to the fifth node via a plurality of other current mirrors.

12. The circuit of claim 10, further comprising:
a fourth current source having at least an output that is coupled to a sixth node; and a sixth current mirror having at least an input that is coupled to the sixth node and an output that is coupled to the first node, wherein the first current mirror further has at least a sixth output that is coupled to a seventh node, the second current mirror further has at least a sixth output that is coupled to the seventh node, and wherein the sixth node is coupled to the seventh node.

13. The circuit of claim 12, wherein
the first current mirror, the third current mirror, the fifth current mirror, the first current source, and the third current source are each arranged to source current; and
wherein the second current mirror, the fourth current mirror, the sixth current mirror, the second current source, and the fourth current source and are each arranged to sink current.

14. A method for current clamping, comprising:
receiving a first current;
receiving a second current; and
providing an output current such that the output current is proportional to a difference between the first current and the second current, such that the output current is clamped, wherein:
providing the output current includes:
 providing the first current to a first node;
 providing the second current to the first node;
 mirroring the first current to provide a first mirrored current;
 mirroring the second current to provide a second mirrored current;
 providing the first mirrored current to a second node;
 providing the second mirrored current to the second node;
 providing a third current to the second node, wherein the third current corresponds to a current limit of one side of the at least one side of the clamping; and
 providing, to the first node, a fifth current by rectifying a fourth current at the second node, wherein the output current is provided at the first node.

15. The method of claim 14, wherein rectifying the fourth current is accomplished by mirroring the fourth current to provide the fifth current.

16. The method of claim 14, wherein
the first current and the first mirrored current are source currents, and
wherein the second current and the second mirrored current are sink currents.

17. The method of claim 14, wherein providing the output current further includes:
mirroring the first current to provide a third mirrored current;
mirroring the second current to provide a fourth mirrored current;
providing the third mirrored current to a third node;
providing the fourth mirrored current to the third node;
providing a sixth current to the third node, wherein the output current and the second current is clamped on both sides including the one side and the other side; and
wherein the fourth current corresponds to a current limit on the other side of the clamping; and
providing, to the first node, an eighth current by rectifying a seventh current at the third node.

18. The method of claim 14, wherein providing the output current further includes:
mirroring the first current to provide a third mirrored current;
mirroring the second current to provide a fourth mirrored current;
providing the third mirrored current to a third node;
providing the fourth mirrored current to the third node;
providing a sixth current at the third node to a fourth node;
providing a seventh current to the third node, wherein the seventh current corresponds to the current limit of the one side of the clamping; and
providing an ninth current to the first node by rectifying an eighth current at the fourth node.

19. The method of claim 18, wherein
providing the sixth current to the fourth node is accomplished by: mirroring the sixth current, and providing the mirrored sixth current to the fourth node.

* * * * *

UNITED STATES PATENT AND TRADEMARK OFFICE
CERTIFICATE OF CORRECTION

PATENT NO. : 7,518,436 B1  
APPLICATION NO. : 11/557804  
DATED : April 14, 2009  
INVENTOR(S) : George A. Hariman Page 1 of 1

It is certified that error appears in the above-identified patent and that said Letters Patent is hereby corrected as shown below:

In column 3, line 65, delete "1a, 1b," and insert -- $I_a$, $I_b$, --, therefor.

In column 4, lines 3-4, delete "($I_a - I_b + I_{clamp}$) $I_{clamp}$" and insert
-- ($I_a - I_b + I_{clamp}$)= – $I_{clamp}$ --, therefor.

In column 4, line 20, delete "1a, 1b," and insert -- $I_a$, $I_b$, --, therefor.

In column 8, line 35, in claim 9, delete "the third" and insert -- to the third --, therefor.

Signed and Sealed this

Tenth Day of November, 2009

David J. Kappos
*Director of the United States Patent and Trademark Office*